Patented Dec. 12, 1944

2,364,777

UNITED STATES PATENT OFFICE 2,364,777

CONCENTRATION OF OXIDIZED IRON ORES

Earl H. Brown and Francis X. Tartaron, Hibbing, Minn., assignors to Minerals Separation North American Corporation, New York, N. Y., a corporation of Maryland No Drawing. Application July 29, 1943,
Serial No. 496,582

13 Claims. (Cl. 209—166)

This invention relates to the concentration of iron ores and more particularly to the concentration of finely-divided, low-grade iron ores in which the iron is present as one of the several oxides of iron or as the carbonate of iron, and in which the gangue is principally silica or quartz.

Processes at present in use for the concentration of iron ores, for example in Minnesota, include washing operations, jigging operations and the so-called sink and float method of concentration. In such washing operations, large quantities of finely divided ore containing important quantities of iron oxides are discarded in the recovery of the coarser material, containing much higher proportions of iron oxides, which are desired for the manufacture of pig iron. The jigging and sink and float methods of concentration are only applicable to comparatively coarse ores; and, before the iron ore as mined can be submitted to these methods of concentration, the finer material regardless of the amount of iron it contains must be discarded and at present is treated as waste. Wastes of the kind just mentioned often contain from 15% to 35% iron and amount to a considerable portion of the mined ore. Many millions of tons of such wastes have accumulated in the mining districts of Minnesota and are constantly being augmented. Moreover, there are vast reservoirs of low-grade oxidized iron ore, locally known as "Taconite," awaiting mining and concentration.

The general object of the present invention is to provide a process by which the valuable iron oxides may be concentrated on a commercial basis from the finely divided iron ore which is at present regarded as wastes, and from "Taconite."

Having found that the iron ores mined in Minnesota contain several oxidized iron minerals mixed with silica or quartz, and that the different oxidized iron minerals respond differently to flotation reagents, we decided to direct our efforts to froth-flotation of the silica away from the iron constituents of the ore, rather than to the froth flotation of the oxidized iron constituents away from the silica. Attempts to float the silica away from the oxidized iron constituents of the ore by the use of cationic collecting agents have, so far as we are aware, proved unsuccessful. Therefore, we devoted our efforts to froth-flotation of the silica away from the oxidized iron constituents in the ore, by the use of anionic collecting agents. At the beginning, such efforts did not yield satisfactory results from the standpoints of grade, recovery and cost of agents employed. After long research and many experiments, however, we have discovered that the major part of the silica contained in such oxidized iron ores can be separated satisfactorily from the oxidized iron constituents of the ore by froth-flotation, by the use of an anionic collecting reagent of the kind hereinafter mentioned, provided such anionic collecting reagent is used with certain cooperating reagents hereinafter described.

The anionic collecting reagents which we have found useful in our process are selected from the class consisting of higher or soap-forming fatty acids and resin acids and their soaps, and mixtures of fatty and resin acids such as that produced as a by-product in paper making and sold under the name "Varlacoid." In some cases we have found it advantageous to dilute these collecting reagents with cresylic acid or alcohol to facilitate their mixing into the ore pulp. The cresylic acid also may be useful in increasing the amount of froth produced in the flotation operation.

The two cooperating reagents, which we have discovered are useful with the anionic collecting reagents and facilitate the selective collection of the silica in the froth, are an aqueous solution of gelatinized starch, and lime preferably in an aqueous suspension. By "gelatinized starch" we mean starch which has been so treated that it is miscible in water as both a colloidal and true solution. The starch may be gelatinized in any suitable way, but we have found that it is best to gelatinize the starch by boiling it in water with caustic soda; and we have found that the best results are obtained if the caustic soda amounts to about 5% to 10% of the weight of the starch. We call such a solution "causticized starch" or "starch caustic." In making the aqueous lime suspension, we have found that about a 25% suspension in water is satisfactory. In referring to the quantities of causticized starch and lime used in examples hereinafter set forth, it is to be understood that the figures given are pounds per ton of feed, dry weight.

In practicing the invention, we have found that improved results are ferquently obtained if the reagents are added to the ore pulp separately and in successive stages with a short period of agitation for conditioning after each such addition, and if the pulp is subjected to froth-flotation treatment and the quartz-containing froth is removed after each stage. The examples hereinafter given make this clear.

Most processes now in use for the concentration of non-sulfide minerals are not effective on the very finest materials, and it is usually necessary to remove these materials from the ores before submitting them to froth-flotation concentrating processes. This is not a serious disadvantage when the extremely fine materials contain but small amounts of the valuable minerals, but in the case of the waste products from which the present invention reclaims marketable material the greater part of the oxidized iron is present in a very finely-divided form, and it is not economically possible to waste them; and one of the important advantages of our invention is that it results even in the concentration of these finely-divided particles of the oxidized iron mineral. However, when our process is called upon to deal with a feed containing colloidally dispersed slimes running low in iron values, we have found it advantageous to remove these slimes prior to the flotation treatment.

The following examples illustrate preferred ways of practicing the invention, but it is to be understood that the invention is not limited to these particular examples, since considerable variations in the amount, combination and application of the reagents may be employed without departing from the spirit of the invention as hereinafter defined in the appended claims.

Example 1

The material used in this example was a finely-divided waste product obtained as a classifier overflow from a washing operation applied to the treatment of a crude oxidized-iron ore from the Mesabi district of Minnesota. This material was made into a pulp containing about 10% solids. To this pulp were added causticized starch (in a 2% boiled aqueous solution containing 90 parts of starch to 10 parts of caustic soda) in the amount of 1.5 lbs. per ton of ore, followed by five minutes of agitation for conditioning. Then lime (in an aqueous suspension) was added to the pulp in the amount of 2.5 lbs. per ton of ore, and the pulp was again agitated for conditioning for about two minutes. Then a mixture of red oil (oleic acid) and cresylic acid (in the proportions of 70 parts of red oil to 30 parts of cresylic acid) in the amount of 2.5 lbs. was added to the pulp, followed again by agitation for conditioning for about one minute. Having thus conditioned the pulp with causticized starch, lime and red oil-cresylic acid, the pulp was subjected to froth flotation and the quartz-bearing froth was removed. The results were as follows:

| Product | Per cent weight | Per cent Fe | Per cent Fe recovery |
| --- | --- | --- | --- |
| Feed | 100.0 | 25.91 | 100.0 |
| Froth | 67.0 | 10.62 | 28.6 |
| Machine discharge | 33.0 | 56.93 | 71.4 |

Example 2

In this example the procedure was the same as in Example 1, except that the amount of lime was increased to 3.0 lbs. per ton of ore, and Varlacoid (a mixture of fatty and resin acids) in the amount of 2.0 lbs. per ton of ore was substituted for the red oil-cresylic acid mixture, and the time of agitation after the addition of each reagent was only one minute. The results of this operation were as follows:

| Product | Per cent weight | Per cent Fe | Per cent Fe recovery |
| --- | --- | --- | --- |
| Feed | 100.0 | 24.51 | 100.0 |
| Froth | 65.1 | 8.52 | 22.6 |
| Machine discharge | 34.9 | 54.32 | 77.4 |

Example 3

The material used in this example was a finely-divided waste product obtained from a washing operation which had been applied to an oxidized iron ore from the Mesabi district of Minnesota. This waste product was mixed with water in a flotation machine to form a 10% pulp, to which were added lime (in an aqueous suspension) in the proportion of 2.5 lbs. per ton of feed; and causticized starch (in a boiled aqueous solution containing 10 parts of caustic soda to 90 parts of starch) in the amount of 1.5 lbs. per ton of feed. The pulp was then agitated for conditioning for about two minutes, after which there was added to the pulp a mixture of 70% red oil (oleic acid) and 30% cresylic acid in an amount equal to 4.0 lbs. per ton of feed, the said mixture being added in two stages of 2.0 lbs. each, and the pulp being agitated for conditioning for half a minute, followed by flotation treatment and removal of the froth product after each stage, the total frothing time being three minutes. The froth products were combined, and the results were as follows:

| Product | Per cent weight | Per cent Fe | Per cent Fe recovery |
| --- | --- | --- | --- |
| Feed | 100.0 | 24.18 | 100.0 |
| Froth product | 61.7 | 3.26 | 8.3 |
| Machine discharge | 38.3 | 57.87 | 91.7 |

Example 4

This example differs from Example 3 in that the causticized starch was added first and followed by one minute agitation, then the lime was added and followed by one minute agitation, and then the red oil-cresylic acid mixture was added in four stages, 1 lb. at a time, each followed by one minute agitation, and then flotation treatment and froth removal for one minute. The four froth products were combined. This gave somewhat better results as to both grade and recovery, as will be evident from the following data:

| Product | Per cent weight | Per cent Fe | Insol. per cent | Per cent Fe recovery |
| --- | --- | --- | --- | --- |
| Feed | 100.0 | 24.66 |  | 100.0 |
| Froth product | 60.8 | 3.09 |  | 7.6 |
| Machine discharge | 39.2 | 58.12 | 8.76 | 92.4 |

Example 5

This example was carried out on ore similar to that used in Examples 3 and 4, but the coarser particles of ore were crushed so that all of the material passed through a 100-mesh screen. The quartz-bearing froth was removed in three stages, the kind and amount of agents and the time of agitation for conditioning before each froth removal being as follows:

For the first froth product: Causticized starch 1.5 lbs., lime 2.5 lbs. Varlacoid 1.0 lb., each per ton of ore; one minute agitation after addition of each reagent.
For the second froth product: Causticized starch 0.25 lb., lime 1.0 lb., Varlacoid 1.0 lb., each per ton of ore; one minute agitation after addition of each reagent.
For the third froth product: Varlacoid 0.50 lb. per ton of ore; one minute agitation after addition of each reagent.

These operations resulted in a higher grade but lower recovery, as will be evident from the following table:

| Product | Per cent weight | Per cent Fe | Insol. per cent | Per cent Fe recovery |
|---|---|---|---|---|
| Feed | 100.0 | 24.63 | | 100.0 |
| 1st froth product | 37.4 | 4.18 | | 6.3 |
| 2nd froth product | 25.6 | 8.35 | | 8.7 |
| 3rd froth product | 3.0 | 21.85 | | 2.7 |
| Machine discharge | 34.0 | 59.62 | 7.00 | 82.3 |

*Example 6*

The procedure in this case was the same as in Example 5, except for amounts of reagents used which were as follows:

For the first froth product: Causticized starch 1.75 lbs., lime 2.50 lbs., Varlacoid 1.00 lb., each per ton of ore; one minute agitation after addition of each reagent.
For the second froth product: Lime 0.75 lb., Varlacoid 0.50 lb., each per ton of ore; one minute agitation after addition of each reagent.
For the third froth product: Varlacoid 0.50 lb., per ton of ore; one minute agitation after addition of the reagent.

This procedure somewhat improved the grade of concentrate and considerably increased recovery, as will be apparent from the following table giving the results of the flotation treatment:

| Product | Per cent weight | Per cent Fe | Insol. per cent | Per cent Fe recovery |
|---|---|---|---|---|
| Feed | 100.0 | 24.48 | | 100.0 |
| 1st froth product | 47.1 | 2.62 | | 5.0 |
| 2nd froth product | 14.5 | 6.66 | | 4.0 |
| 3rd froth product | 2.2 | 26.47 | | 2.4 |
| Machine discharge | 36.2 | 59.93 | 5.50 | 88.6 |

*Example 7*

In Examples Nos. 1 to 6, the feed averaged about 24% Fe. The present example involves the treatment of a much lower grade of oxidized iron ore, namely one containing only 14.03% Fe. Only two froth products were removed, the amounts of reagents and the time of agitation preceding each froth removal being as follows:

For the first froth product: Causticized starch 1.50 lbs., lime 3.0 lbs., Varlacoid 1.0 lb., each per ton of ore; one minute agitation after the addition of each reagent.
For the second froth product: Lime 0.75 lb., Varlacoid 0.5 lb., each per ton of ore; one minute agitation after addition of each reagent.

The results of the flotation treatment are given in the following table:

| Product | Per cent weight | Per cent Fe | Insol. per cent | Per cent Fe recovery |
|---|---|---|---|---|
| Feed | 100.0 | 14.03 | | 100.0 |
| 1st froth product | 66.8 | 1.30 | | 6.2 |
| 2nd froth product | 13.6 | 13.56 | | 13.1 |
| Machine discharge | 19.6 | 57.73 | 7.44 | 80.7 |

*Example 8*

This example is based on a much higher grade of iron ore, namely one containing 32% Fe. This ore contained about 25% plus 100-mesh material, but before treatment it was all crushed to pass 100-mesh. The causticized starch solution employed was prepared by boiling an aqueous mixture of caustic soda and starch containing 5 parts of caustic soda to 95 parts solid starch. The amounts of reagents used and the time of agitation were as follows:

For the first froth product: Causticized starch 1.25 lbs., lime 3.0 lbs., Varlacoid 0.75 lb., each per ton of ore; one minute agitation after addition of each reagent.
For the second froth product: Causticized starch 0.25 lb., lime 1.25 lbs., Varlacoid 1.0 lb., each per ton of ore; one minute agitation after addition of each reagent
For the third froth product: Varlacoid 0.5 lb. per ton of ore; one minute agitation after addition of the reagent.

The results of the flotation treatment were as follows:

| Product | Per cent weight | Per cent Fe | Insol. per cent | Per cent Fe recovery |
|---|---|---|---|---|
| Feed | 100.0 | 32.00 | | 100.0 |
| 1st froth product | 33.7 | 7.15 | | 7.5 |
| 2nd froth product | 22.0 | 16.24 | | 11.2 |
| 3rd froth product | 4.0 | 38.33 | 42.65 | 4.8 |
| Machine discharge | 40.3 | 60.74 | 8.02 | 76.5 |

*Example 9*

This example is based on the same ore as that used as the feed in Example 3. The starch-caustic employed was a boiled aqueous mixture of 92.5% starch and 7.5% caustic. The collecting agent was a mixture of 85% Varlacoid, 10.5% red oil and 4.5% cresylic acid. These reagents were added to the pulp of the ore in stages as follows:

For the first froth product: Causticized starch 1.6 lbs., lime 2.5 lbs., Varlacoid-red oil-cresylic acid mixture 1.25 lbs., each per ton of ore; one minute agitation after addition of each reagent.
For the second froth product: Lime 0.75 lb., Varlacoid-red oil-cresylic acid mixture 0.8 lb., per ton of ore; one minute agitation after addition of each reagent.
For the third froth product: Varlacoid-red oil-cresylic acid mixture 1.0 lb., per ton of ore; one minute agitation after addition of the reagent.

The results of the flotation treatment were as follows:

| Product | Per cent weight | Per cent Fe | Insol. per cent | Per cent Fe recovery |
|---|---|---|---|---|
| Feed | 100.0 | 24.73 | | 100.0 |
| 1st froth product | 40.0 | 2.50 | | 4.0 |
| 2nd froth product | 21.1 | 7.19 | | 6.1 |
| 3rd froth product | 4.5 | 31.33 | | 5.7 |
| Machine discharge | 34.4 | 60.48 | 7.09 | 84.2 |

If the third froth had been omitted, the machine discharge would have run 57.08% Fe with and 89.9% Fe recovery.

Example 10

This example is based on a mixture of wastes from the washing of an oxidized-iron ore, blended so as to give a feed of average expectable iron content. The starch caustic employed was a boiled aqueous solution of 92.5% starch and 7.5% caustic soda. The collector was a mixture of 95% Varlacoid and 5% cresylic acid. The reagents were added to a pulp containing about 10% solids, as follows:

For the first float: Starch caustic 0.8 lb., lime 2.5 lbs., Varlacoid-cresylic acid 1.0 lb., each per ton of ore; one minute agitation after the addition of each reagent.

For the second float: Starch caustic 0.2 lb., lime 0.75 lb., Varlacoid-cresylic acid 0.5 lb., each per ton of ore; one minute agitation after the addition of each reagent.

For the third float: Varlacoid-cresylic acid 0.5 lb. per ton of ore; one minute agitation after addition of the reagent.

The results of the flotation treatment were as follows:

| Product | Per cent weight | Per cent Fe | Insol. per cent | Per cent Fe recovery |
|---|---|---|---|---|
| Feed | 100.0 | 20.08 | | 100.0 |
| 1st froth product | 47.8 | 2.66 | | 6.3 |
| 2nd froth product | 19.2 | 5.07 | | 4.8 |
| 3rd froth product | 3.2 | 21.08 | | 3.4 |
| Machine discharge | 29.8 | 57.60 | 11.32 | 85.5 |

Example 11

This example demonstrates the use of Chatham fatty acid (a distilled and refined tall oil) as a collector in practicing our invention. The feed was classifier overflow from a washer, which was made into a pulp of about 10% solids. The starch caustic employed contained 92.5% starch and 7.5% caustic soda, boiled in water as a 2% solution. The reagents were added as follows:

For the first froth product: starch caustic 1.5 lbs, lime 4.0 lbs., Chatham fatty acid 1.25 lbs.; one minute agitation after the addition of each reagent, followed by one and one-half minutes flotation treatment.

For the second froth product: starch caustic 0.2 lb., lime 0.75 lb., Chatham fatty acid 0.5 lb.; one minute agitation after the addition of each reagent, followed by one minute flotation treatment.

For the third froth product: Chatham fatty acid 0.5 lb.; one minute agitation after the addition of the reagent, followed by one minute flotation treatment.

The results of the flotation treatments were as follows:

| Product | Per cent weight | Per cent Fe | Per cent Fe recovery |
|---|---|---|---|
| Feed | 100.0 | 17.31 | 100.0 |
| 1st froth product | 51.8 | 2.59 | 7.8 |
| 2nd froth product | 15.1 | 5.25 | 4.6 |
| 3rd froth product | 4.8 | 14.31 | 4.0 |
| Machine discharge | 28.3 | 51.18 | 83.6 |

Example 12

In this example, the procedures were identical with the procedures in Example 11, except that Upjohn's fatty acid (a fish oil fatty acid) was substituted for Chatham fatty acid. The results were as follows:

| Product | Per cent weight | Per cent Fe | Per cent Fe recovery |
|---|---|---|---|
| Feed | 100.0 | 17.64 | 100.0 |
| 1st froth product | 57.5 | 2.50 | 8.2 |
| 2nd froth product | 8.6 | 4.04 | 2.0 |
| 3rd froth product | 5.3 | 11.64 | 3.5 |
| Machine discharge | 28.6 | 53.28 | 86.3 |

Example 13

In this example, the procedures were the same as in Example 11, except that linoleic acid was used as the collector instead of Chatham fatty acid. The results were as follows:

| Product | Per cent weight | Per cent Fe | Per cent Fe recovery |
|---|---|---|---|
| Feed | 100.0 | 17.18 | 100.0 |
| 1st froth product | 64.4 | 3.32 | 12.5 |
| 2nd froth product | 10.6 | 9.64 | 5.9 |
| 3rd froth product | 2.6 | 32.48 | 4.9 |
| Machine discharge | 22.4 | 58.81 | 76.7 |

Example 14

This example demonstrates the use of resin acid, which has been converted into sodium resinate, as a collector in practicing our invention. The feed was classifier overflow from a washer, which was made into a pulp of about 10% solids. The starch caustic employed contained 92.5% starch and 7.5% caustic soda, boiled in water as a 2% suspension. The sodium resinate was employed as a 5% solution in water. The reagents were added as follows:

For the first froth product: Starch caustic 2.0 lbs., lime 3.5 lbs., sodium resinate 0.5 lb., each per ton of solids in the feed; one minute agitation after the addition of each reagent, followed by two minutes flotation treatment.

For the second froth product: Lime 1.0 lb., sodium resinate 0.2 lb., each per ton of ore; one minute agitation after the addition of each reagent, followed by one minute flotation treatment.

For the third froth product: Sodium resinate 0.2 lb. per ton of ore; one minute agitation after the addition of the reagent, followed by one minute flotation treatment.

The results of the flotation treatments were as follows:

| Product | Per cent weight | Per cent Fe | Per cent Fe recovery |
| --- | --- | --- | --- |
| Feed | 100.0 | 17.25 | 100.0 |
| 1st froth product | 61.5 | 3.14 | 11.2 |
| 2nd froth product | 11.8 | 9.23 | 6.3 |
| 3rd froth product | 2.0 | 21.46 | 2.5 |
| Machine discharge | 24.7 | 55.89 | 80.0 |

*Example 15*

As hereinbefore stated, the starch used in the methods exemplified by the previous examples may be gelatinized in any suitable way, although we have found that it is best to gelatinize the starch by boiling it in water with caustic soda. This example demonstrates practice of the invention with an aqueous solution of starch which has been gelatinized merely by boiling it as a 2% suspension in water for about one minute. The feed was classifier overflow from a washer, which was ground through 100-mesh and made into a pulp of about 10% solids. The collecting agent was Varlacoid; and the lime was used in about a 25% suspension in water. The reagents were added to the pulp of the ore in stages as follows:

For the first froth product: Boiled starch 1.5 lbs., lime 3.0 lbs., Varlacoid 1.0 lb., each per ton of ore; one minute agitation after addition of each reagent, followed by flotation treatment.

For the second froth product: Lime 0.75 lb., Varlacoid 0.5 lb., each per ton of ore; one minute agitation after the addition of each reagent, followed by flotation treatment.

For the third froth product: Varlacoid 0.5 lb. per ton of ore; one minute agitation after addition of the reagent, followed by flotation treatment.

The results of the flotation treatments were as follows:

| Product | Per cent weight | Per cent Fe | Per cent Fe recovery |
| --- | --- | --- | --- |
| Feed | 100.0 | 14.52 | 100.0 |
| 1st froth product | 40.1 | 3.21 | 8.9 |
| 2nd froth product | 29.0 | 5.78 | 11.5 |
| 3rd froth product | 4.0 | 11.25 | 3.1 |
| Machine discharge | 26.9 | 41.30 | 76.5 |

*Example 16*

This example demonstrates practice of the invention utilizing starch caustic prepared by employing an 80 to 20 mixture of 80 parts of starch and 20 parts of caustic soda with water, said mixture being about 2% of the water. Agitation of this mixture for about 20 minutes without heating produced a solution of gelatinized starch. The feed was substantially the same as in Example 15, and was made into a pulp containing about 10% solids. The reagents were added to the pulp of the ore in stages as follows:

For the first froth product: Unboiled starch-caustic 1.5 lbs., lime 3.0 lbs., Varlacoid 0.5 lb., each per ton of ore; one minute agitation after the addition of each reagent, followed by froth-flotation treatment.

For the second froth product: Lime 0.75 lb., Varlacoid 0.5 lb., each per ton of ore; one minute agitation after the addition of each reagent, followed by flotation treatment.

For the third froth product: Varlacoid 0.25 lb. per ton of ore; one minute agitation for conditioning, followed by flotation treatment.

The results of the flotation treatments were as follows:

| Product | Per cent weight | Per cent Fe | Per cent Fe recovery |
| --- | --- | --- | --- |
| Feed | 100.0 | 15.00 | 100.0 |
| 1st froth product | 43.0 | 2.40 | 6.9 |
| 2nd froth product | 34.4 | 7.04 | 16.1 |
| 3rd froth product | 3.4 | 23.36 | 5.3 |
| Machine discharge | 19.2 | 56.00 | 71.7 |

What is claimed is:

1. The method of concentrating finely-divided oxidized-iron ores in which the gangue ingredient is principally quartz, which consists in treating an aqueous pulp of such an ore with an anionic collecting agent selected from the class consisting of higher fatty acids and resin acids and their soaps and mixtures of fatty and resin acids, and with cooperating agents consisting of lime and an aqueous solution of gelatinized starch, and subjecting the thus treated or pulp to froth-flotation treatment and removing the quartz-containing froth, thereby producing in the residue of the pulp an oxidized-iron concentrate.

2. The method of claim 1, utilizing oleic acid as the anionic collecting agent.

3. The method of claim 1, utilizing a mixture of fatty and resin acids as the anionic collecting agent.

4. The method of claim 1, utilizing a mixture of fatty and resin acids and oleic acid as the anionic collecting agent.

5. The method of claim 1, utilizing a resin acid as the anionic collecting agent.

6. The method of claim 1, with cresylic acid added as a diluent to the anionic collecting agent.

7. The method of claim 1, utilizing starch which has been gelatinized by boiling with caustic soda in an aqueous solution, as the last-mentioned cooperating agent.

8. The method of claim 1, utilizing as the last-mentioned cooperating agent starch which has been gelatinized by boiling with caustic soda in an aqueous solution in the proportions of 90% to 95% starch and 10% to 5% caustic soda.

9. The method of claim 1, practiced with agitation of the pulp for conditioning after the addition of each reagent.

10. The method of claim 1, practiced with stage conditioning and froth flotation treatments of the pulp.

11. The method of claim 1, practiced with conditioning of the pulp first with an aqueous solution of gelatinized starch, lime and collecting agent, then with additional lime and collecting agent, and finally with additional collecting agent, each of said conditionings being followed by flotation treatments and removal of the quartz-containing froth.

12. The method of claim 1, utilizing an aqueous solution of starch which has been gelatinized by boiling it with water, as the last-mentioned cooperating agent.

13. The method of claim 1, utilizing starch which has been gelatinized by agitating a mixture of starch and caustic soda in an aqueous solution, as the last-mentioned cooperating agent.

EARL H. BROWN.
FRANCIS X. TARTARON.